(12) United States Patent
Matsuda

(10) Patent No.: US 10,309,508 B2
(45) Date of Patent: Jun. 4, 2019

(54) WHEEL STATOR ASSEMBLY

(71) Applicant: EXEDY Corporation, Neyagawa-shi, Osaka (JP)

(72) Inventor: Satoru Matsuda, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 343 days.

(21) Appl. No.: 15/434,661

(22) Filed: Feb. 16, 2017

(65) Prior Publication Data

US 2017/0268646 A1 Sep. 21, 2017

(30) Foreign Application Priority Data

Mar. 18, 2016 (JP) .................................. 2016-055065

(51) Int. Cl.
*F16H 41/24* (2006.01)

(52) U.S. Cl.
CPC ....... *F16H 41/24* (2013.01); *F16H 2041/246* (2013.01)

(58) Field of Classification Search
CPC ........................... F16H 41/24; F16H 2041/246
See application file for complete search history.

(56) References Cited

U.S. PATENT DOCUMENTS

| 4,240,532 | A | * | 12/1980 | Blomquist | F16F 15/12313 192/212 |
| 5,125,487 | A | * | 6/1992 | Hodge | F16D 41/067 192/3.34 |
| 5,881,556 | A | * | 3/1999 | Matsuoka | F16H 41/30 60/339 |
| 6,814,203 | B2 | * | 11/2004 | Kamiya | F16D 41/07 192/110 B |
| 6,941,752 | B2 | * | 9/2005 | Ochi | F16D 33/00 60/339 |
| 6,959,544 | B2 | * | 11/2005 | Fukunaga | F16H 41/26 60/330 |
| 7,100,755 | B2 | * | 9/2006 | Takasu | F16D 41/067 192/45.1 |
| 7,832,536 | B2 | * | 11/2010 | Maeda | F16H 41/24 192/110 B |

FOREIGN PATENT DOCUMENTS

JP 2001193816 A 7/2001
KR 100660568 B1 * 12/2006

* cited by examiner

*Primary Examiner* — Thomas E Lazo
(74) *Attorney, Agent, or Firm* — United IP Counselors, LLC

(57) ABSTRACT

A wheel stator assembly includes a one-way clutch, a stator and a thrust plate. The one-way clutch includes an inner race and an outer race disposed on an outer peripheral side of the inner race. The stator includes a stator carrier and a plurality of stator blades. The stator blades are mounted on an outer peripheral side of the stator carrier. The stator carrier is supported by an outer peripheral part of the outer race. The stator carrier includes an inner peripheral extended part. The inner peripheral extended part extends to an inner peripheral side and is opposed to a lateral surface of the inner race. The thrust plate is disposed axially between the inner race and the inner peripheral extended part of the stator carrier and can contact the lateral surface of the inner race. The thrust plate is rotatable in synchronization with the stator carrier.

6 Claims, 7 Drawing Sheets

WHEEL STATOR ASSEMBLY

CROSS-REFERENCE TO RELATED APPLICATIONS

This application claims priority to Japanese Patent Application No. 2016-055065 filed on Mar. 18, 2016, the entirety of which is hereby incorporated by reference in its entirety.

BACKGROUND

Technical Field

The present disclosure relates to a wheel stator assembly, and particularly to a wheel stator assembly for regulating the direction of fluid flowing from a turbine to an impeller in a torque converter.

Background Information

A torque converter includes an impeller, a turbine and a stator in its interior. Additionally in the torque converter, a wheel stator assembly including the stator is disposed between the impeller and the turbine. As described in Japan Laid-open Patent Application Publication No. 2001-193816, the wheel stator assembly includes the stator and a one-way clutch.

The one-way clutch includes an inner race, an outer race and a plurality of rollers. The inner race is non-rotatably fixed to a stator shaft. The outer race is disposed on the outer peripheral side of the inner race. The rollers are disposed between the inner race and the outer race. The stator is supported by the outer peripheral part of the outer race. The stator includes an annular stator carrier and a plurality of stator blades disposed on the outer peripheral surface of the stator carrier. Additionally, part of the stator carrier extends to an inner peripheral side. The part extending to the inner peripheral side is opposed to a lateral surface of the inner race and is also contactable thereto.

In general, the stator carrier is integrally formed by die casting of aluminum. On the other hand, the surface of the inner race is hardened by carburizing.

In the construction as described above, when a hydraulic oil flows through a lateral side of the stator carrier, the stator carrier receives a thrust load directed toward an engine, i.e., a thrust load directed toward the lateral surface of the inner race. On the other hand, the inner race is spline-coupled to the stator shaft. Hence, the inner race is unlikely to move in the axial direction. With this construction, the part of the stator carrier, extending to the inner peripheral side, is supposed to be pressed against the lateral surface of the inner race by the thrust load while in contact therewith.

When the speed ratio of the torque converter herein increases with increase in rotational speed of the engine, the stator is supposed to idle due to the action of the one-way clutch. In such a situation, the part of the stator carrier, extending to the inner peripheral side, is supposed to slide against the lateral surface of the inner race. Consequently, the stator carrier is abnormally abraded due to its low hardness.

SUMMARY

It is an object of the present disclosure to inhibit abrasion of the stator carrier with a simple construction.

(1) A wheel stator assembly according to the present disclosure is a wheel stator for regulating a direction of a fluid flowing from a turbine to an impeller in a torque converter. The wheel stator assembly includes a one-way clutch, a stator and a thrust plate. The one-way clutch includes an inner race and an outer race. The outer race is disposed on an outer peripheral side of the inner race. The stator includes a stator carrier and a plurality of stator blades. The stator carrier is supported by an outer peripheral part of the outer race. The stator carrier includes an inner peripheral extended part. The inner peripheral extended part extends to an inner peripheral side so as to be opposed to a lateral surface of the inner race. The plurality of stator blades are mounted to an outer peripheral side of the stator carrier. The thrust plate is disposed axially between the inner race and the inner peripheral extended part of the stator carrier so as to be contactable to the lateral surface of the inner race. The thrust plate is configured to be rotatable in synchronization with the stator carrier.

The thrust plate is herein disposed between the inner race and the inner peripheral extended part of the stator carrier. With this construction, the stator carrier does not slide in direct contact with the inner race. Hence, abrasion of the stator carrier can be prevented. On the other hand, the thrust plate slides in contact with the inner race. However, when made of iron, the thrust plate can be easily processed with surface hardening. Hence, the thrust plate can be constructed not to be easily abraded. Moreover, even when abraded, the thrust plate can be treated as a consumable product due to its relatively low manufacturing cost.

(2) The thrust plate may have a surface hardness that is lower than a surface hardness of the inner race and is higher than a surface hardness of the stator.

In this construction, abrasion of the thrust plate by the stator carrier can be inhibited.

(3) The inner peripheral extended part of the stator carrier may include at least one engaged part. The thrust plate may include at least one engaging part. The at least one engaging part is engaged with the at least one engaged part.

In this construction, the stator carrier and the thrust plate are configured to be rotated in synchronization with each other. Hence, it is reliably possible to make the inner race and the thrust plate slide against each other without making the stator carrier and the thrust plate slide against each other.

(4) The at least one engaged part of the stator carrier may be at least one hole or cutout. The at least one hole or cutout axially penetrates the stator carrier. Additionally, the at least one engaging part of the thrust plate may be at least one pawl. The at least one pawl is formed by bending part of the thrust plate. The at least one pawl is inserted into the at least one hole or cutout.

(5) The stator carrier may include an annular recess recessed in an axial direction. Additionally, the thrust plate may be press-fitted to the annular recess so as to be non-rotatable with respect to the stator carrier.

(6) The inner race may be made of iron and may be processed with surface hardening. Additionally, the thrust plate may be made of iron and may be processed with surface hardening. Moreover, the stator may be made of aluminum by die casting.

As described above, in the present disclosure, direct contact between the inner race and the stator carrier can be avoided, and abrasion of the stator carrier can be inhibited with a simple construction.

BRIEF DESCRIPTION OF THE DRAWINGS

Referring now to the attached drawings which form a part of this original disclosure.

DETAILED DESCRIPTION OF EMBODIMENTS

<Entire Construction>

Figure 1:
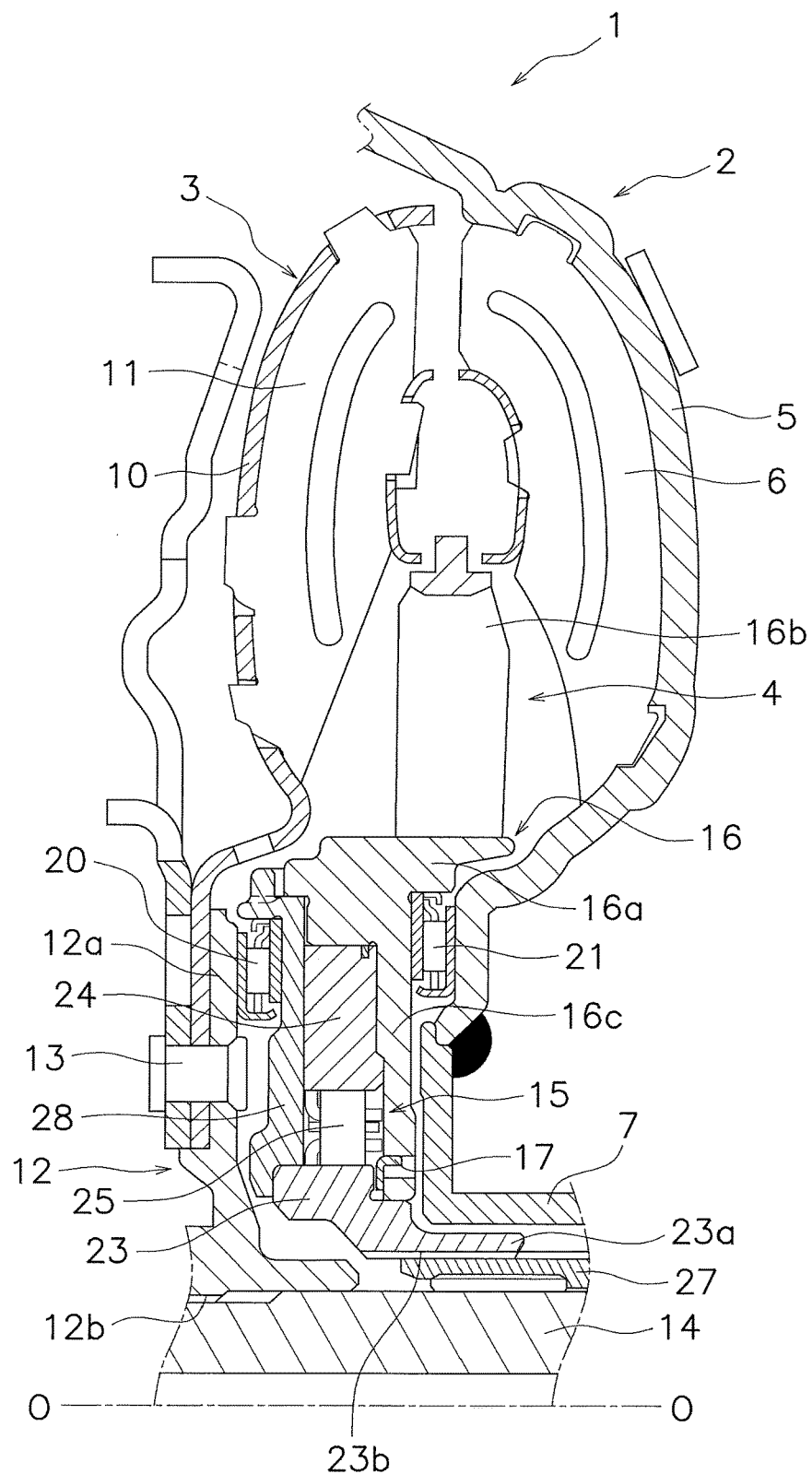
FIG. 1 is a cross-sectional view of a construction of a torque converter including a wheel stator assembly according to a preferred embodiment of the present disclosure.

FIG. 1 shows a torque converter body 1 as part of a torque converter including a wheel stator assembly according to a preferred embodiment of the present disclosure. Line 0-0 indicates the rotational axis of the torque converter body 1. The torque converter body 1 includes an impeller 2, a turbine 3 and a wheel stator assembly 4. It should be noted that a lock-up clutch is disposed on an engine side (left side in FIG. 1) of the torque converter body 1 although not shown in FIG. 1. The lock-up clutch is configured to directly transmit a torque from an engine to a transmission-side input shaft.

<Torque Converter Body 1>

The impeller 2 includes an impeller shell 5, a plurality of impeller blades 6 fixed to the inside of the impeller shell 5, and an impeller hub 7. The impeller shell 5 is connected at its outer peripheral part to a front cover (not shown in the drawings) to which the torque from the engine is inputted. Additionally, the impeller shell 5 is fixed at its inner peripheral end to the impeller hub 7.

The turbine 3 is disposed in opposition to the impeller 2. The turbine 3 includes a turbine shell 10, a plurality of turbine blades 11 fixed to the inside of the turbine shell 10, and a turbine hub 12. The turbine shell 10 is fixed at its inner peripheral end to a flange 12a of the turbine 12 by rivets 13. The turbine hub 12 is provided with a spline hole 12b on its inner periphery. The spline hole 12b is coupled onto the transmission-side input shaft, i.e., an input shaft 14. It should be noted that in the present preferred embodiment, the turbine hub 12 is composed of two members. However, the turbine hub 12 may be composed of a single member.

<Wheel Stator Assembly 4>

The wheel stator assembly 4 includes a one-way clutch 15, a stator 16 and a thrust plate 17. It should be noted that a thrust bearing 20 is disposed between the wheel stator assembly 4 and the flange 12a of the turbine hub 12, whereas a thrust bearing 21 is disposed between the wheel stator assembly 4 and the impeller shell 5.

Figure 2:
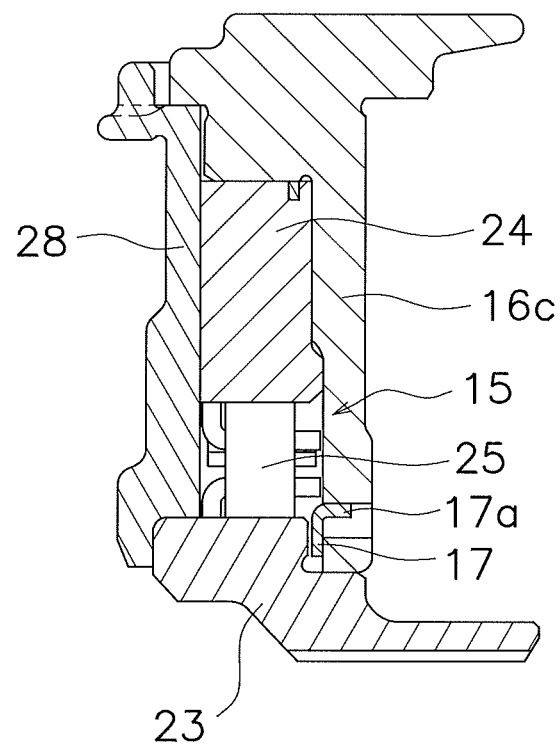
FIG. 2 is a partial enlarged view of FIG. 1.

As shown in FIG. 1 and FIG. 2 that is a partial enlarged view of FIG. 1, the one-way clutch 15 includes an inner race 23, an outer race 24 and a plurality of rollers 25 as a clutch portion.

The inner race 23 has an annular shape and includes an extended part 23a on its inner peripheral part. The extended part 23a extends to a transmission side (right side in FIG. 1). The extended part 23a is provided with a spline hole 23b on its inner peripheral part. The spline hole 23b is spline-coupled to the outer peripheral surface of a stator shaft 27. The inner race 23 is made of iron, and its surface is hardened by carburizing, induction hardening or so forth. It should be noted that the stator shaft 27 is non-rotatable while being fixed to a transmission-side fixation member (not shown in the drawings). The outer race 24 is an annular member disposed on the outer peripheral side of the inner race 23. Additionally, the plural rollers 25 are disposed between the inner race 23 and the outer race 24, and compose the clutch portion. The plural rollers 25 are held each other by a holder. It should be noted that an annular retainer plate 28 is mounted to the engine side of the one-way clutch 15 in the axial direction. The retainer plate 28 restricts the plural rollers 25 from jumping out to the engine side in the axial direction.

The stator 16 is a disc-shaped member and includes a hole in its center part. The stator 16 includes a stator carrier 16a and a plurality of stator blades 16b. The stator carrier 16a is supported by the outer peripheral surface of the outer race 24. The stator blades 16b are mounted to the outer peripheral side of the stator carrier 16a. Additionally, the stator carrier 16a is provided with an inner peripheral extended part 16c. The inner peripheral extended part 16c extends from an impeller hub 7-side region of the inner peripheral part of the stator carrier 16a to the further inner peripheral side. The inner peripheral extended part 16c extends to a position opposed to the impeller hub 7-side lateral surface of the inner race 23. It should be noted that the stator 16 is integrally formed by die casting of aluminum.

The thrust plate 17 has an annular shape and is disposed axially between the inner race 23 and the inner peripheral extended part 16c of the stator carrier 16a. The thrust plate 17 is made of iron such as SPHC (Steel Plate Hot Commercial), and its surface is hardened by gas soft nitriding. In other words, the surface hardness of the thrust plate 17 is lower than that of the inner race 23 and is higher than that of the stator carrier 16a. The thrust plate 17 is contactable to the lateral surface of the inner race 23, and is rotatable in synchronization with the stator carrier 16a.

Figure 3:
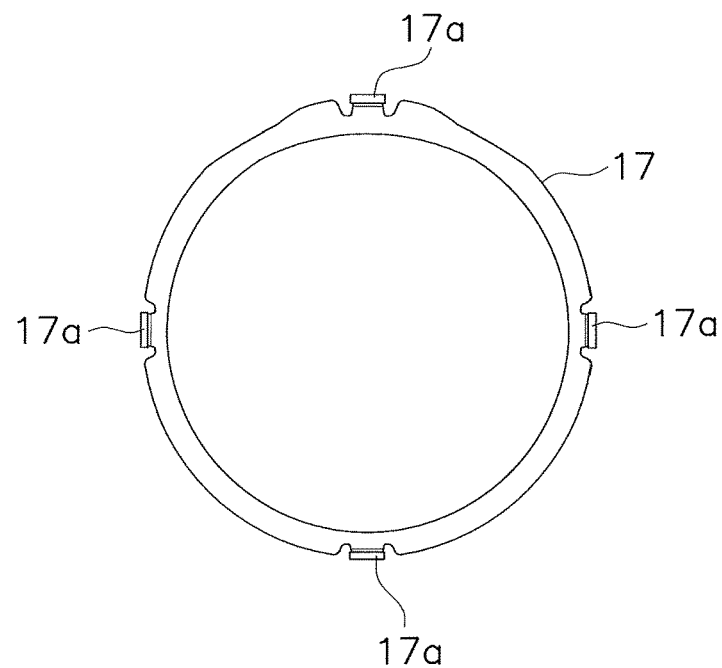
FIG. 3 is a front view of a thrust plate.
Figure 4:
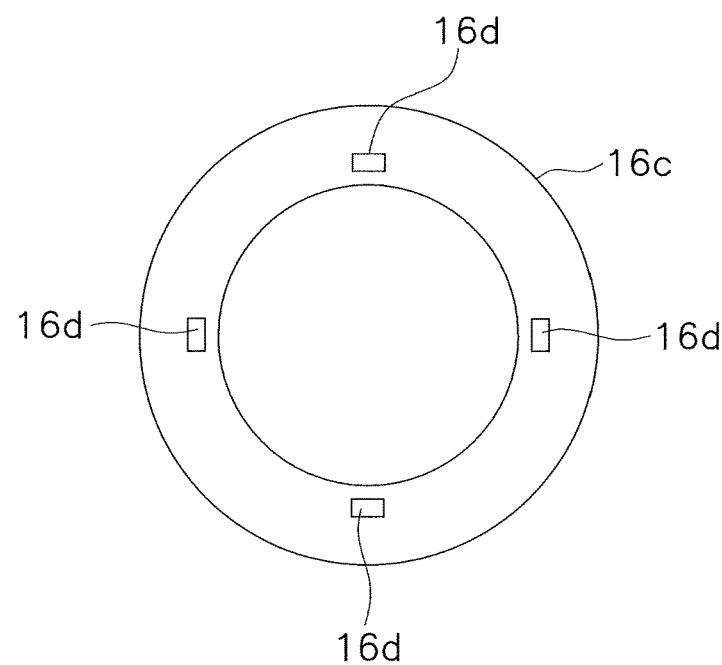
FIG. 4 is a partial front view of a stator carrier.

Specifically, as shown in FIGS. 2 and 3, four pawls 17a are disposed on the outer peripheral end of the thrust plate 17, while being aligned at equal angular intervals. The four pawls 17a are formed by bending part of the outer peripheral end of the thrust plate 17 at a right angle toward the inner peripheral extended part 16c of the stator carrier 16a. On the other hand, as shown in FIG. 4, the stator carrier 16a is provided with four holes 16d in the inner peripheral extended part 16c. The holes 16d penetrate the inner peripheral extended part 16c in the axial direction while being aligned at equal angular intervals. Additionally, the pawls 17a of the thrust plate 17 are inserted into the holes 16d, respectively. With this construction, the thrust plate 17 is configured to be rotated in synchronization with the stator 16, i.e., the stator carrier 16a.

<Actions>

When the front cover is rotated by a torque from the engine, the torque converter body 1 is rotated. In other words, the impeller 2 is rotated, and accordingly, the turbine 3 is rotated through hydraulic oil supplied to the interior of the torque converter body 1. Rotation of the turbine 3 is transmitted to the transmission-side input shaft 14 through the turbine hub 12.

Now, when the rotational speed of the engine is low, the hydraulic oil, after having passed through the turbine 3, collides with one surfaces of the stator blades 16b, and a rotational force directed in one direction acts on the outer race 24 of the one-way clutch 15. In this case, the clutch portion including the rollers 25 is turned into a clutch-on state (i.e., a torque transmission allowed state), and the stator 16 and the outer race 24 are rotated together with and in the same direction as the inner race 23. In other words, the inner race 23 and the stator 16 (the stator carrier 16a) are not rotated relatively to each other. Accordingly, the hydraulic oil, returning to the impeller 2 from the stator 16, flows in the rotational direction of the impeller blades 6 of the impeller 2. As a result, a torque of the turbine 3 increases.

When the rotational speed of the engine increases and the rotational speed of the turbine 3 becomes close to that of the impeller 2, the hydraulic oil from the turbine 3 flows while colliding with the other surfaces of the stator blades 16b, and a rotational force directed oppositely to the aforementioned one direction acts on the outer race 24. In this case, the clutch portion including the rollers 25 is turned into a clutch-off state (i.e., a torque transmission prevented state), and the outer race 24 and the stator 16 (the stator carrier 16a) are configured to be rotated reversely to the aforementioned direction with respect to the inner race 23. In other words, the stator carrier 16a and the inner race 23 are configured to be rotated relatively to each other.

Additionally, while the stator carrier 16a and the inner race 23 are being rotated relatively to each other, the torque converter body 1 deforms due to increase and reduction in internal pressure. In accordance with this, the wheel stator assembly 4 is similarly forced to move. At this time, the inner race 23 will stay as it is whereas a thrust load acts on the stator carrier 16a.

In the aforementioned situation, according to the present preferred embodiment, the thrust plate 17 is disposed between the inner peripheral extended part 16c of the stator carrier 16a and the lateral surface of the inner race 23, and the thrust plate 17 is rotated in synchronization with the inner peripheral extended part 16c of the stator carrier 16a. Therefore, unlike a well-known torque converter, not the stator carrier 16a and the inner race 23 but the thrust plate 17 and the inner race 23 are herein configured to slide in contact with each other. The thrust plate 17 is made of iron and its surface is processed with hardening. Hence, even in sliding against the inner race 23, the thrust plate 17 can be inhibited from being abraded. Additionally, even when abrasion of the thrust plate 71 progresses, it is only required to replace the thrust plate 71 as a single abraded component. Thus, the torque converter of the present exemplary embodiment can cope with replacement of an abraded component at a lower cost than the well-known torque converter in which the stator carrier 16a tends to be abraded and is thus required to be replaced.

<Features>

In the present preferred embodiment, the thrust plate 17 is provided such that the stator carrier 16a (the inner peripheral extended part 16c) does not slide in direct contact with the inner race 23. Hence, abrasion of the stator carrier 16a can be prevented. Additionally, instead of the stator carrier 16a, the thrust plate 17 slides in contact with the inner race 23. However, the surface of the thrust plate 17 is processed with hardening. Hence, abrasion of the thrust plate 17 can be inhibited.

Other Preferred Embodiments

The present disclosure is not limited to the aforementioned preferred embodiment, and a variety of changes or modifications can be made without departing from the scope of the present disclosure.

The construction for rotating the thrust plate 17 and the stator 16 (the inner peripheral extended part 16c) in synchronization with each other is not limited to that descried in the aforementioned preferred embodiment.

Figure 5:
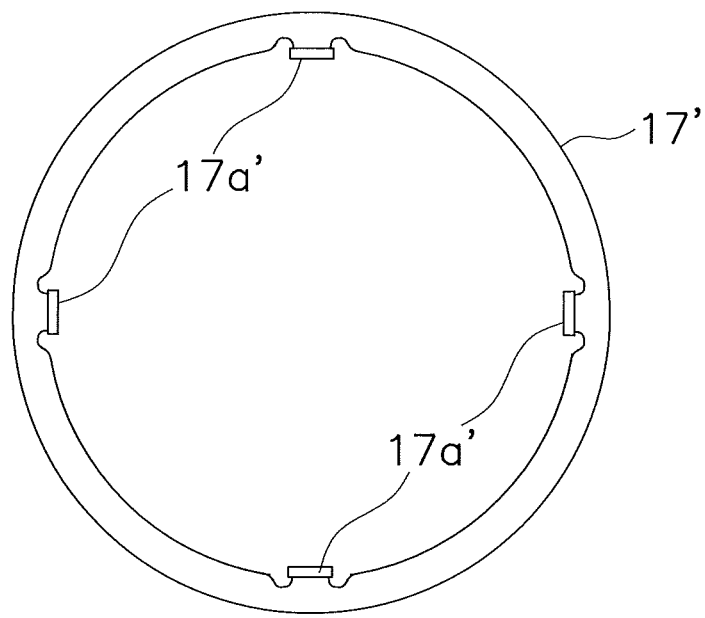
FIG. 5 is a diagram corresponding to FIG. 3 in another preferred embodiment of the present disclosure.
Figure 6:
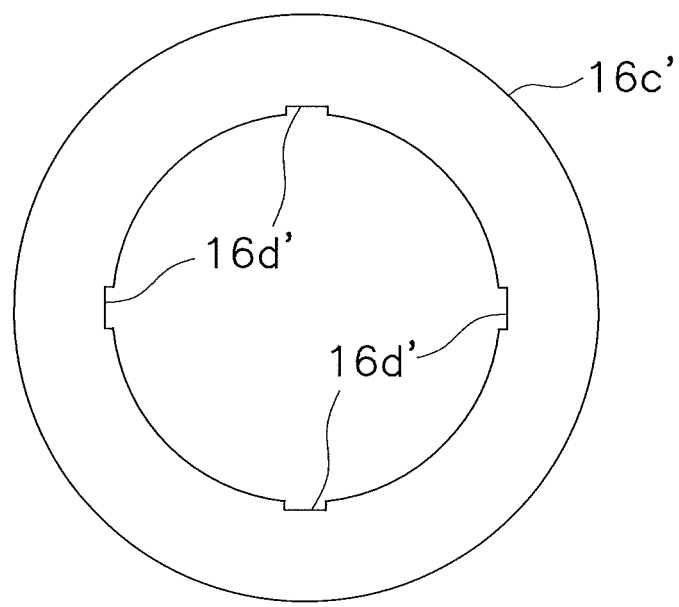
FIG. 6 is a diagram corresponding to FIG. 4 in the aforementioned another preferred embodiment of the present disclosure.

For example, a thrust plate 17' may be provided with four pawls 17a' on its inner peripheral end as shown in FIGS. 5 and 6. The pawls 17a' are formed by bending part of the inner peripheral end of the thrust plate 17' toward the stator carrier. The pawls 17a' may be designed to be inserted into cutouts 16d' provided on the inner peripheral end of an inner peripheral extended part 16c' of the stator carrier.

Figure 7:
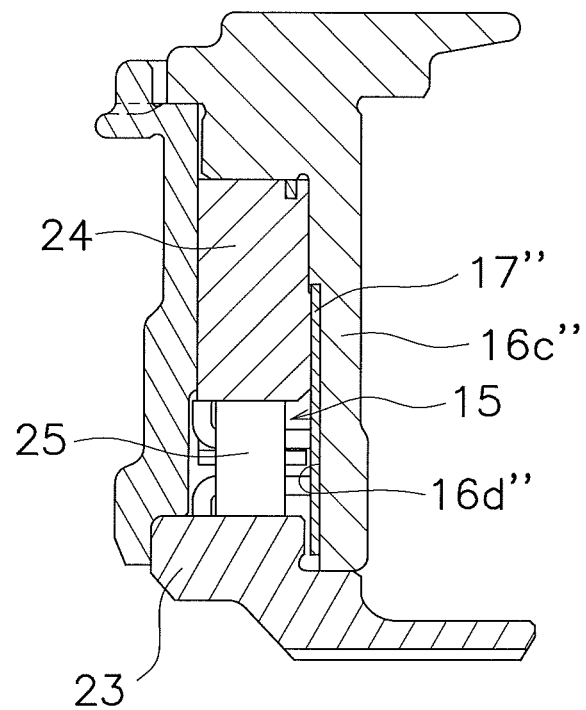
FIG. 7 is a diagram showing a construction for fixing a thrust plate in yet another preferred embodiment of the present disclosure.

Alternatively, as shown in FIG. 7, the stator carrier may be provided with an annular recess 16d" on the one-way clutch side lateral surface of an inner peripheral extended part 16c". A thrust plate 17" may be designed to be fixed to the annular recess 16d" by press-fitting.

Figure 8:
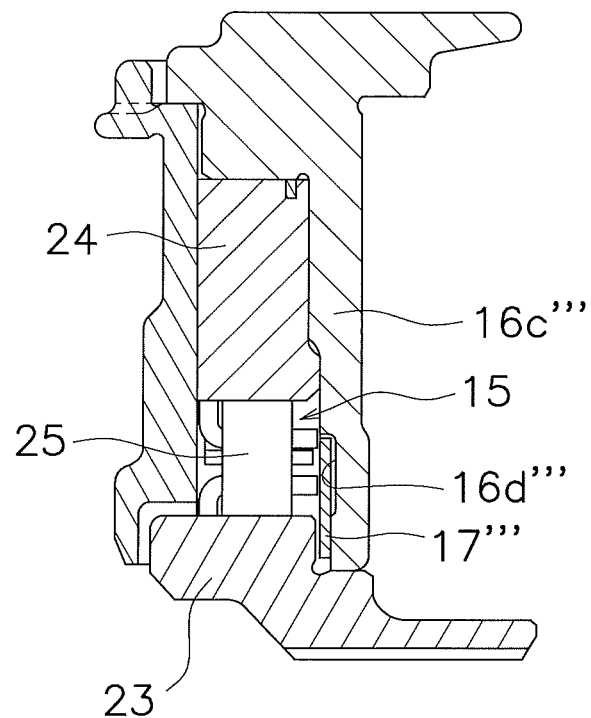
FIG. 8 is a cross-sectional view of a construction for fixing a thrust plate in further yet another preferred embodiment of the present disclosure.
Figure 9:
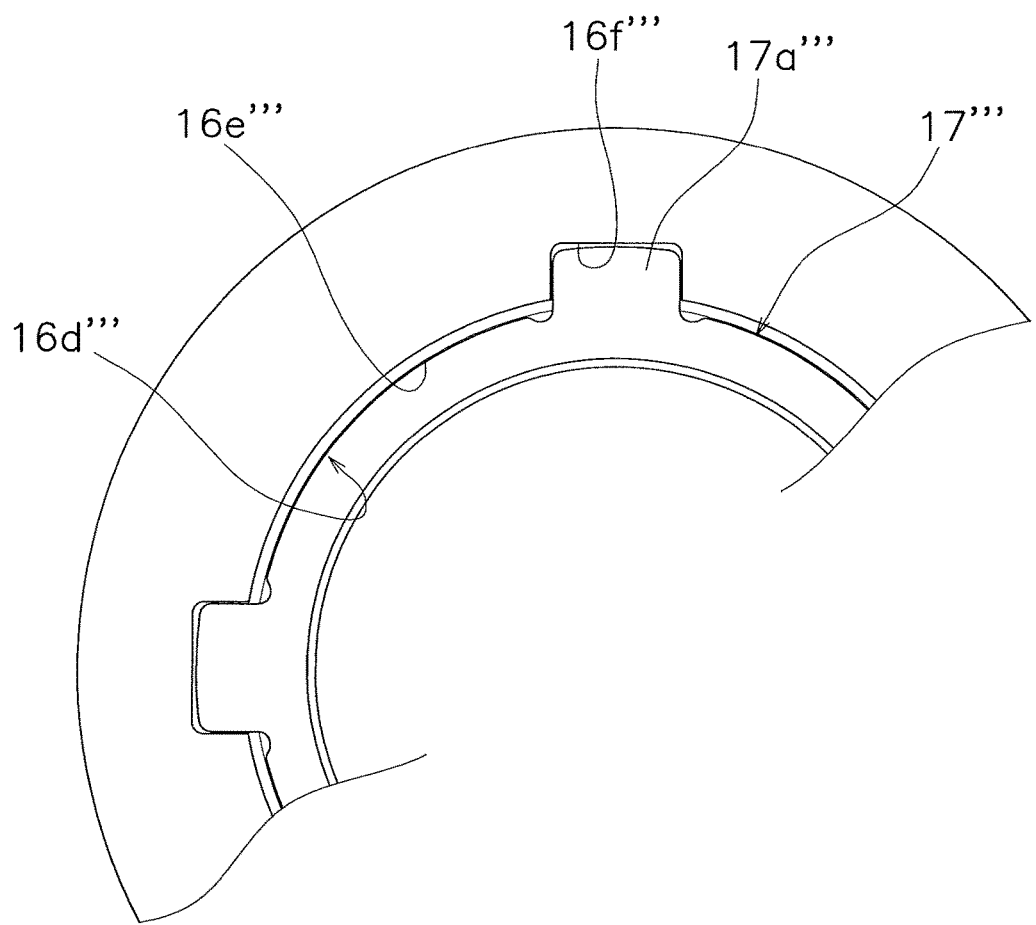
FIG. 9 is a front view of a construction shown in FIG. 8.

Yet alternatively, as shown in FIGS. 8 and 9, a thrust plate 17''' may include a plurality of pawls 17a''' for an anti-rotation purpose. The pawls 17a''' may be designed to be fitted to a recess 16d''' provided on an inner peripheral extended part 16c''' of the stator carrier. The recess 16d''' includes an annular recess 16e''' and rectangular cross-sectional recesses 16f. The rectangular cross-sectional recesses 16f are recessed from the annular recess 16e''' to the outer peripheral side. The pawls 17a''' of the thrust plate 17''' are designed to be fitted into the rectangular cross-sectional recesses 16f'''.

What is claimed is:

1. A wheel stator assembly for regulating a direction of a fluid flowing from a turbine to an impeller in a torque converter, the wheel stator assembly comprising:
    a one-way clutch including an inner race and an outer race, the outer race disposed on an outer peripheral side of the inner race;
    a stator including a stator carrier and a plurality of stator blades, the plurality of stator blades mounted to an outer peripheral side of the stator carrier, the stator carrier supported by an outer peripheral part of the outer race, the stator carrier including an inner peripheral extended part, the inner peripheral extended part extending to an inner peripheral side so as to be opposed to a lateral surface of the inner race; and
    a thrust plate disposed axially between the inner race and the inner peripheral extended part of the stator carrier so as to be contactable to the lateral surface of the inner race, the thrust plate configured to be rotatable in synchronization with the stator carrier.

2. The wheel stator assembly according to claim 1, wherein the thrust plate has a surface hardness that is lower than a surface hardness of the inner race and is higher than a surface hardness of the stator.

3. The wheel stator assembly according to claim 1, wherein
    the inner peripheral extended part of the stator carrier includes at least one engaged part, and
    the thrust plate includes at least one engaging part, the at least one engaging part engaged with the at least one engaged part.

4. The wheel stator assembly according to claim 3, wherein
    the at least one engaged part of the stator carrier is at least one hole or cutout, the at least one hole or cutout axially penetrating the stator carrier, and
    the at least one engaging part of the thrust plate is at least one pawl, the at least one pawl formed by bending part of the thrust plate, the at least one pawl inserted into the at least one hole or cutout.

5. The wheel stator assembly according to claim 1, wherein
   the stator carrier includes an annular recess recessed in an axial direction, and
   the thrust plate is press-fitted to the annular recess so as to be non-rotatable with respect to the stator carrier.

6. The wheel stator assembly according to claim 1, wherein
   the inner race is made of iron, the inner race processed with surface hardening,
   the thrust plate is made of iron, the thrust plate processed with surface hardening, and
   the stator is made of aluminum by die casting.

* * * * *